United States Patent
Cao et al.

(10) Patent No.: US 6,879,118 B2
(45) Date of Patent: Apr. 12, 2005

(54) METHOD FOR POSITION REGULATION OF AN ELECTRIC DRIVE AND FOR STEERING A MOTOR VEHICLE BY MEANS OF A STEER-BY-WIRE SYSTEM

(75) Inventors: Chi-Thuan Cao, Korntal (DE); Petral Blessing, Heilbronn (DE)

(73) Assignee: Robert Bosch GmbH, Stuttgart (DE)

( * ) Notice: Subject to any disclaimer, the term of this patent is extended or adjusted under 35 U.S.C. 154(b) by 42 days.

(21) Appl. No.: 10/240,898

(22) PCT Filed: Feb. 6, 2002

(86) PCT No.: PCT/EP02/01209

§ 371 (c)(1),
(2), (4) Date: Feb. 27, 2003

(87) PCT Pub. No.: WO02/062646

PCT Pub. Date: Aug. 15, 2002

(65) Prior Publication Data

US 2003/0169003 A1 Sep. 11, 2003

(30) Foreign Application Priority Data

Feb. 6, 2001 (DE) .......................... 101 05 154

(51) Int. Cl.⁷ .............................. B62D 5/04; B62D 6/00; H02P 7/68
(52) U.S. Cl. ............................ 318/34; 701/41; 180/443
(58) Field of Search ................................ 180/405, 412, 180/403, 415, 422, 446, 443, 6.2, 6.28; 318/34, 139, 434, 432; 701/41, 42

(56) References Cited

U.S. PATENT DOCUMENTS 5,347,458 A * 9/1994 Serizawa et al. ............. 701/41
6,097,286 A * 8/2000 Discenzo .................... 340/465
6,219,604 B1 * 4/2001 Dilger et al. ................. 701/41
6,298,940 B1 * 10/2001 Bohner et al. .............. 180/403
6,548,969 B2 * 4/2003 Ewbank et al. ............... 318/34
6,580,989 B1 * 6/2003 Husain et al. ................ 701/41
6,640,173 B1 * 10/2003 Zheng ......................... 701/41
6,661,191 B2 * 12/2003 Zheng et al. ............... 318/434
6,687,588 B2 * 2/2004 Demerly et al. .............. 701/41
2002/0144855 A1 * 10/2002 Zheng et al.. ............... 180/446
2003/0114969 A1 * 6/2003 Dominke et al. ............ 701/41
2003/0196847 A1 * 10/2003 Zheng et al. ............... 180/402

FOREIGN PATENT DOCUMENTS

DE 195 41 749 5/1997
DE 196 16 437 8/1997
DE 199 12 169 7/2000
DE 100 18 191 10/2000

* cited by examiner

Primary Examiner—David Martin
Assistant Examiner—Eduardo Colon Santana
(74) Attorney, Agent, or Firm—Baker & Daniels

(57) ABSTRACT

A method for steering a motor vehicle with a steer-by-wire steering system. A setpoint is for the position of the steered wheels is generated from the steering wheel angle. A controlled difference is then generated between the setpoint and the actual value of the position of the steered wheel and the position of the steered wheel is then adjusted in accordance with the controlled difference. The steering wheel torque is then adjusted based on the torque's and/or forces prevailing between the steered wheels and a steering controller or based on a performance graph.

22 Claims, 4 Drawing Sheets

KEY TO FIGURE 1:
a. $M_M$ [manual torque]
b. Frequency converter
c. Steering-wheel controller
d. $M_{M,set}$
e. $δ_{SW}$ [steering-wheel angle]
f. $δ_{SW,set}$ [steering-wheel angle setpoint]
g. Setpoint generating system
h. Steering actuator
i. Valve-actuator frequency converter

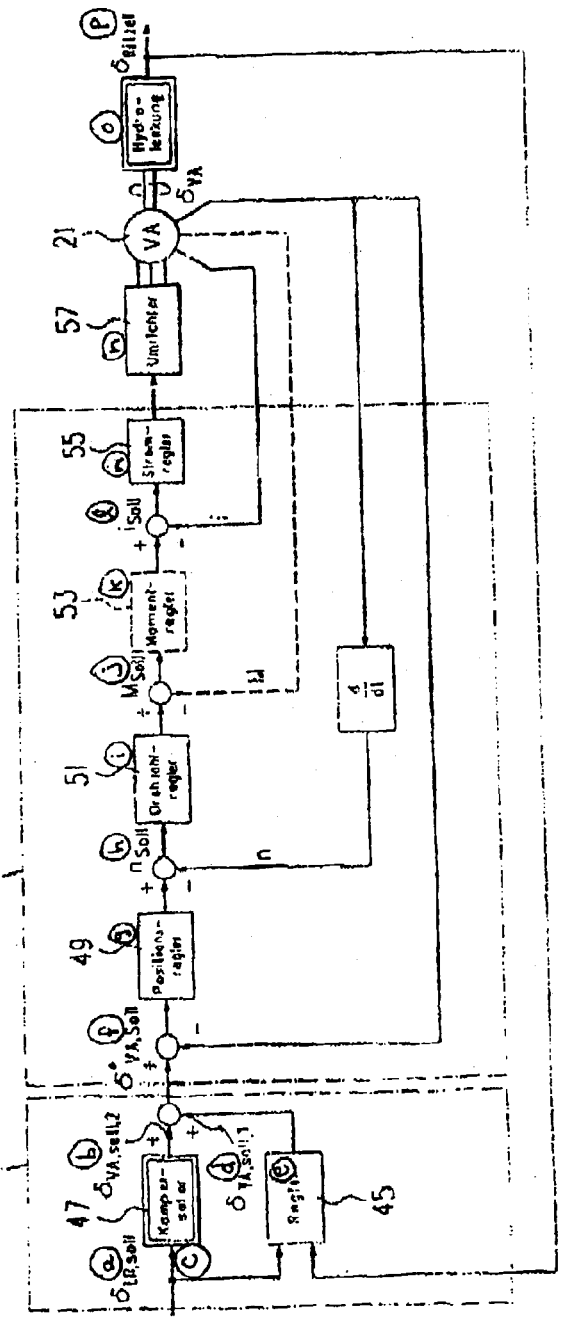

KEY TO FIGURE 2:
a. $\delta_{SW, set}$
b. $\delta_{VA, set2}$ [second rotation angle setpoint of valve actuator]
c. Compensator
d. $\delta_{VA, set1}$ [first rotation angle setpoint of valve actuator]
e. Controller
f. $\delta_{VA, set}$ (rotation angle setpoint of valve actuator]
g. Position controller
h. $n_{set}$ [rotation speed setpoint]
i. Rotation speed controller
j. $M_{set}$ [torque setpoint]
k. Torque controller
l. $I_{set}$ [current setpoint]
m. Current controller
n. Frequency converter
o. Hydraulic steering
p. $\delta_{pinion}$

Fig. 2

KEY TO FIGURE 3:
a. $\delta_{SW}$ [rotation angle of steering wheel]
b. Speed-dependent conversion
c. $\delta_C$ [course angle]
d. Tracking controller
e. $\delta_{SW,var1}$ [first correction angle on steering-wheel angle]
f. Vehicle-dynamics controller
g. $\delta_{SW,var2}$ [second correction angle on steering-wheel angle]
h. $\delta_{SW,set}$ [steering-wheel angle setpoint]

KEY TO FIGURE 4:
a. $\delta_{SW,set}$
b. $\delta_{pinion}$
c. $\delta_{VA,set1}$

METHOD FOR POSITION REGULATION OF AN ELECTRIC DRIVE AND FOR STEERING A MOTOR VEHICLE BY MEANS OF A STEER-BY-WIRE SYSTEM

BACKGROUND OF THE INVENTION

This invention relates to a method for positionally controlling an electric drive and for steering a motor vehicle with a steer-by-wire steering system.

The positions of electric drives must be controlled in a wide variety of technical fields. Examples include not only the electric drives of machine tools and manufacturing robots, but also the valve actuators of steer-by-wire steering systems having hydraulic steering boxes.

All of these positional controls have in common the fact that the position of the electric drive must follow the prescribed setpoint with the least possible delay and without overshooting. It is also desirable that the position control be able to perform effectively with the lowest possible number of sensors, and further, that it exhibit robust control behavior that is insensitive to internal and external disturbances.

The position-control method of the invention is described hereinbelow with reference to the example of a valve actuator of a so-called steer-by-wire steering system having a hydraulic steering box. This does not imply limiting the scope of the instant invention to steer-by-wire steering systems or to methods of steering a motor vehicle with a steer-by-wire system.

Steer-by-wire steering systems are distinguished by the absence of any continuous mechanical connection between the steering wheel and the steered wheels.

There are two sets of problems that must be overcome in the design of steer-by-wire systems. First, the driver's steering input must be transmitted from the steering wheel to the steered wheels, and second, the driver must receive feedback from the steered wheels to the steering wheel. The driver senses this feedback as a torque exerted on him by the steering wheel. This torque will be referred to hereinbelow as the steering feel.

Such a steer-by-wire system must be at least as good as a conventional servo steering system in terms of operational reliability and control behavior. Furthermore, it must be possible to integrate higher-order functions such as tracking control or vehicle dynamics control and crosswind compensation into the steer-by-wire system. Finally, a steer-by-wire system must be readily adaptable to different types of vehicles.

The object of the instant invention is to provide methods for position control, particularly for steering a motor vehicle with a steer-by-wire system, that exhibit high control quality, operate safely and reliably, and permit the integration of higher-order functions.

SUMMARY OF THE INVENTION

This object is accomplished according to the invention by means of a method for positionally controlling an electric drive and a method for steering a motor vehicle with a steer-by-wire system wherein:

the steering-wheel angle is detected;
the steering-wheel angle is converted into a setpoint for the position of the steered wheels;
an actual value of the position of the steered wheels is detected;
a control difference between the setpoint and the actual value of the position of the steered wheels is generated;
the position of the steered wheels is adjusted according to the control difference;
a steering-wheel torque is adjusted according to the torque setpoints and/or the forces prevailing between the steered wheels and a steering regulator.

This method improves control quality and operational reliability, since the steering torque and the positions of the steered wheels are adjusted separately. This structure supports the conversion of the method into a modular software program. In addition, higher-order functions can be integrated readily and adaptation to different vehicles is simplified.

As a complement to the method of the invention, it is provided that a first controller outputs, as a manipulated variable derived from the control difference, a first setpoint of a valve actuator of a hydraulic steering system; that in parallel with the first controller, a compensator outputs, as a manipulated variable derived from the setpoint for the position of the steered wheels, a second setpoint of the valve actuator, that the first setpoint and the second setpoint are added to yield a setpoint of the valve actuator; and that the setpoint is the reference variable for a motor controller, so that nonlinearities of the hydraulic steering box are compensated for by the compensator and the subsequent control can thus be performed as a linear control.

As a complement to the method of the invention, it is provided that in the first controller, the control difference $\delta_{SW,\,set} - \delta_{pinion}$ is amplified according to the rotation angle $\delta_{pinion}$ of the pinion in the region of the center position of the pinion, and that the product of the control difference $\delta_{SW,\,set} - \delta_{pinion}$ and the amplification is integrated in an integrator to yield the first setpoint $\delta_{VA,\,set\,1}$. This increases the control difference at the center position of the steering, as a result of which the manipulated variable of the steering controller is increased and the steering system therefore reacts sensitively to small changes in the driver's steering input when the steering wheel and the steered wheels are at or near center position.

In a further variant of the invention, it is provided that the motor controller is implemented as a cascade controller comprising a master controller and at least one slave controller, and that the control difference of the master controller is generated from the setpoint and the actual value of a rotation angle of the valve actuator.

In particular, it is provided that the master controller is a position controller and that the manipulated variable of the master controller is a rotation speed setpoint of the valve actuator. The control difference of a first slave controller implemented as a rotation-speed controller is generated from the rotation speed setpoint and the actual rotation speed of the valve actuator. The manipulated variable of the rotation-speed controller is a torque setpoint of the valve actuator. A current setpoint of the valve actuator is generated from the torque setpoint via a torque/current characteristic. The control difference of a second slave controller implemented as a torque controller is generated from the torque setpoint and the actual torque of the valve actuator. The control difference of a third slave controller implemented as a current controller is generated from the current setpoint and the actual current of the valve actuator. The current controller drives the valve actuator via a frequency converter.

The use of a cascade controller improves control quality in that the response behavior of the control is enhanced without any accompanying oversteering of the steered wheels.

Further complements to the method of the invention provide that a first disturbance variable $M_{dist1}$ is subtracted from the manipulated variable $M_{set}$ of the master controller and that the first disturbance variable is calculated according to the following equation:

$$M_{dist1} = C_{torsion\ bar}(\delta_{pinion} - \delta_{VA,\ actual}),$$

$C_{torsion}$ bar being the torsion spring rate of the torsion-bar valve.

Incorporating a disturbance variable in this manner compensates for the oscillation caused by the torsion bar, and the control reacts even more quickly and accurately to changes in the driver's steering input.

The control quality can be further improved by subtracting a damping torque $M_{damp}$ from the manipulated variable $M_{set}$ of the master controller and calculating the damping torque $M_{damp}$ according to the following equation:

$$M_{damp} = D(\omega_{pinion} - \omega_{VA,\ actual})$$

where D represents a constant and ω a rotation speed.

In further complements to the method of the invention, the generation of the setpoint for the position of the steered wheels is performed in a speed-dependent manner. A first correction angle is superimposed on the steering-wheel angle by a tracking controller according to a steering-wheel course angle. A second correction angle is superimposed on the steering-wheel acceleration and/or the yaw rate of the vehicle, so that the steering behavior and the driving stability of a vehicle equipped with a steer-by-wire system according to the invention are improved and surpass the driving behavior of a vehicle equipped with a conventional servo steering system. In addition, crosswind compensation, for example, can also be performed.

A further embodiment of the method according to the invention provides that the steering-wheel torque is generated according to the difference between the rotation angle of the valve actuator and the pinion angle, or that the steering-wheel torque is controlled according to the actual current of the valve actuator, thereby eliminating the need for a torque sensor.

The above object is also accomplished according to the invention by means of a steer-by-wire system for a vehicle, comprising a steering wheel, a steering column, a rotation-angle sensor, a steering-wheel motor acting on the steering column, a steering actuator acting on the steered wheels via a steering box and a tie rod, and a control unit, so that the advantages of the method according to the invention are also brought to bear in the steer-by-wire system according to the invention.

BRIEF DESCRIPTION OF THE DRAWINGS

The above-mentioned and other features and advantages of this invention, and the manner of attaining them, will become more apparent and the invention itself will be better understood by reference to the following description of embodiments of the invention taken in conjunction with the accompanying drawings, wherein:

FIG. 2 is a block diagram of an exemplary embodiment of a method according to the invention;

Corresponding reference characters indicate corresponding parts throughout the several views. The exemplification set out herein illustrates one preferred embodiment of the invention, in one form, and such exemplification is not to be construed as limiting the scope of the invention in any manner.

DESCRIPTION OF THE PREFERRED EMBODIMENTS

Figure 1:
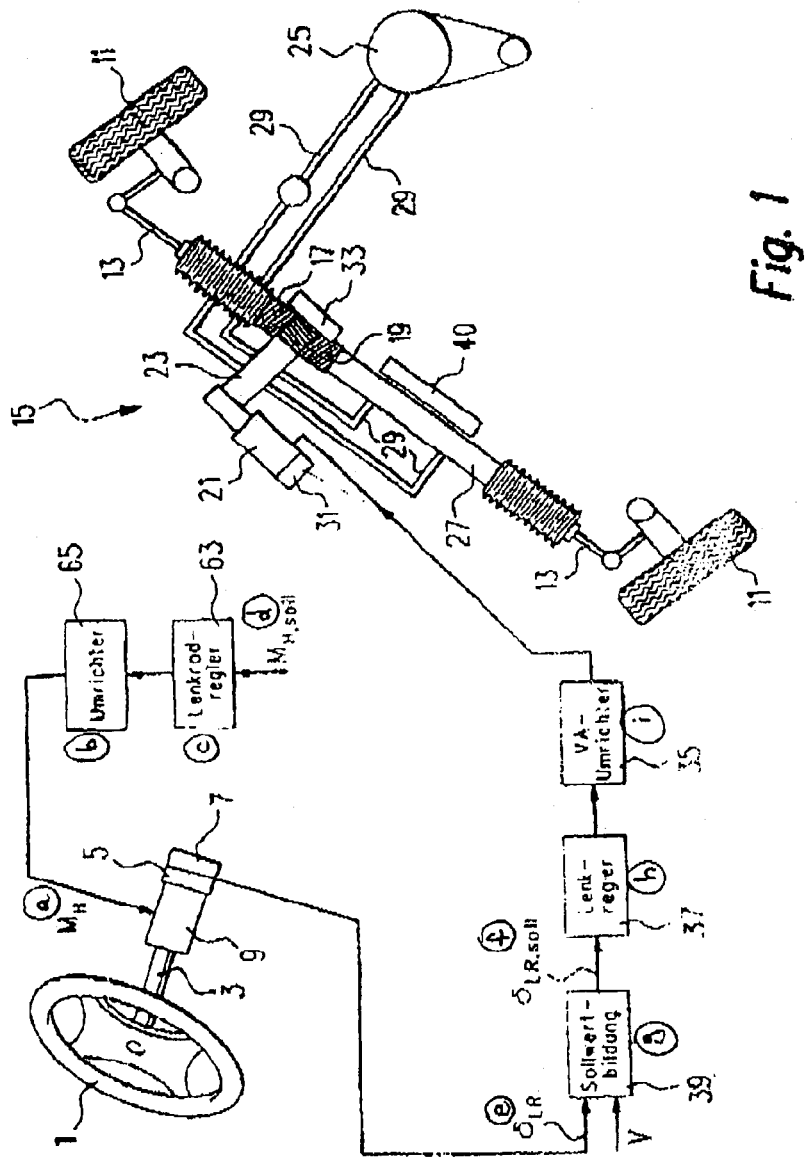
FIG. 1 is a schematic diagram of an exemplary embodiment of a steer-by-wire system.

FIG. 1 represents a steering wheel 1 with a steering column 3 of a steer-by-wire system according to the invention. Arranged on the steering column 3 are a first rotation-angle sensor 5, a second rotation-angle sensor 7 and an electric motor 9 for the steering wheel.

The steered wheels 11 of the motor vehicle, as shown in FIG. 1, are connected to one another via a tie rod 13 and are steered by a steering actuator 15. Steering actuator 15 is based on a well known hydraulic steering box. The steering box of steering actuator 15 is implemented as a rack-and-pinion steering box comprising a rack 17 and a pinion 19. In conventional steering systems, the pinion 19 is driven by the steering column 3. In the steer-by-wire system of the invention, pinion 19 is driven by an electric valve actuator 21. Disposed between valve actuator 21 and pinion 19 is a torsion-bar valve 23. Torsion-bar valve 23 controls the servo assistance of steering actuator 15 by releasing, to a greater or lesser extent, a hydraulic connection between a feed pump 25 and a double-acting working cylinder 27, which is shown in merely indicative fashion in FIG. 1. Working cylinder 27 acts on tie rod 13. Feed pump 25, torsion-bar valve 23 and working cylinder 27 are interconnected via connecting lines 29. Provided on the rotor of valve actuator 21 is a third rotation-angle sensor 31, which detects the rotation angle of valve actuator 21. Provided on pinion 19 is a fourth rotation-angle sensor 33, which detects the rotation angle of pinion 19. Rotation-angle sensor 33 can be supplanted by a position sensor 40.

Arranged in torsion-bar valve 23 is a torsion bar (not visible in FIG. 1), which twists in dependence on the torque transmitted from valve actuator 21 to pinion 19. On the one hand, the twist of the torsion bar is utilized in torsion-bar valve 23 to drive working cylinder 27, and on the other hand, an angular difference between the third and fourth rotation-angle sensors can be used to determine the amount of torque applied by valve actuator 21. This eliminates the need for a torque sensor on steering actuator 15. Any transmission gearing that may be present between valve actuator 21 and pinion 19 must also be taken into account.

Valve actuator 21 is driven via a valve-actuator frequency converter 35 and a steering actuator 37. The reference variable of steering actuator 37 is a steering setpoint $\delta_{SW,\ set}$, which is generated according to the rotation angle $\delta_{SW}$ of the steering wheel 1 as measured by first rotation-angle sensor 5 and/or second rotation-angle sensor 7 and, for example, the road speed of the vehicle. The control system of steering actuator 15 and the steered wheels 11 is shown in block diagram form in FIG. 2.

FIG. 2 is a block diagram of a control system according to the invention for the steering actuator. The steering control system consists of a steering controller 41 and a motor controller 43.

Steering controller 41 in turn consists of a controller 45 and a compensator 47. Controller 45 controls the rotation angle $\delta_{pinion}$ of pinion 19. The reference variable of controller 45 is the setpoint wheel angle $\delta_{SW,\ set}$ imposed by a setpoint generating system (not shown in FIG. 2). Provided in parallel with controller 45 is a compensator 47 that serves to offset nonlinear effects of the steering actuator 15, especially of the hydraulic steering. From the output variables of controller 45 and compensator 47, a setpoint $\delta^*_{VA,\,set}$ is generated. This setpoint $\delta^*_{VA,\,set}$ is the reference variable of motor controller 43. Motor controller 43 is implemented as a cascade controller and comprises, in the exemplary embodiment shown, a master controller 49 implemented as a position controller, a first slave controller 51 implemented as a rotation-speed controller, optionally a second slave controller 53 implemented as a torque controller, and a third slave controller 55 implemented as a current controller.

Master controller 49 has the task of adjusting the angle $\delta_{VA}$ measured by third rotation-angle sensor 31 at valve actuator 21 in such a way that $\delta_{VA}$ follows the setpoint $\delta_{VA,\,set}$ without overshooting. The output variable of master controller 49 is a rotation speed setpoint $n_{set}$ that serves as the reference variable for first slave controller 51. First slave controller 51 evaluates the difference between the setpoint rotation speed $n_{set}$ and the actual rotation speed n of valve actuator 21, which can be deduced, for example, from the change in rotation angle $\delta_{VA}$ over time. The output variable of first slave controller 51 is a torque setpoint $M_{set}$. In the case of torque control, a current setpoint $I_{set}$ is generated from the difference between the torque setpoint $M_{set}$ and an actual torque $M_{actual}$ determined at valve actuator 21, as noted above. Optionally, the second slave controller 53 can also be omitted and the current setpoint $I_{set}$ obtained by means of a torque/current characteristic.

A third slave controller 55 then adjusts the current supplied to valve actuator 21 by comparing the current setpoint $I_{set}$ to an actual current $I_{actual}$ measured at valve actuator 21 and delivering a drive signal to a frequency converter 57.

Implementing motor controller 43 as a cascade controller with a master control loop governed by a master controller 49 and multiple slave control loops improves the quality of the control of rotation angle $\delta_{pinion}$. When a disturbance occurs, the change that begins earliest in time, for example a change in the rotation speed n, the torque M or the current I, is sufficient to trigger a control process through the slave controller, an approach that assists the control system as a whole. This makes it possible for the rotation angle $\delta_{pinion}$ of pinion 19 to follow the steering-wheel-angle setpoint $\delta_{SW}$, set rapidly, but without overshooting.

Figure 3:
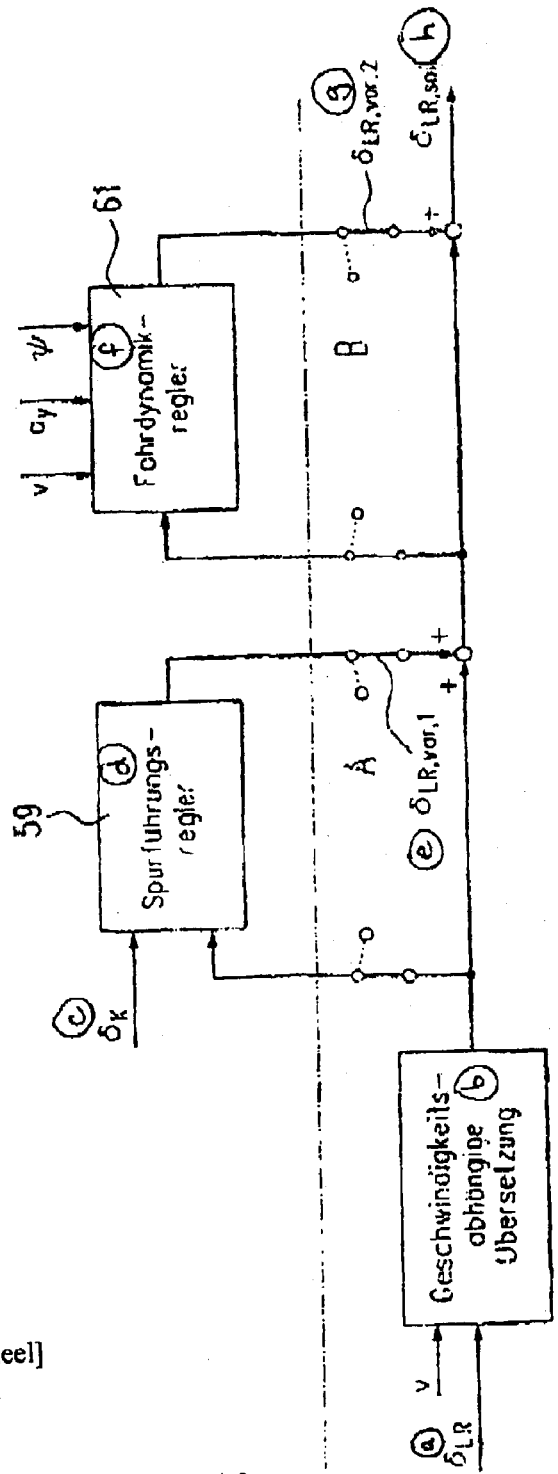
FIG. 3 is a block diagram of a first complement to the method of the invention.

The aforementioned setpoint generating system 39 is shown in greater detail in FIG. 3. Taking as a point of departure a driver steering input materialized in the form of a steering-wheel angle $\delta_{SW}$, the steering-wheel angle setpoint $\delta_{SW,set}$ is modified according to the speed v of the vehicle. This permits speed-dependent conversion of the rotary motion imposed on the steering wheel 1 into rotary motion of the pinion 19, which acts on the rack 17.

Optionally, the steering-wheel angle setpoint $\delta_{SW,\,set}$ can also be influenced by further higher-order functions. For example, in FIG. 3 a tracking controller 59 is provided, which is connected to the setpoint generating system via an interface A. The tracking controller 59 superimposes a first correction angle $\delta_{SW,\,var1}$ on the driver's steering input $\delta_{SW}$ in accordance with a course angle $\delta_C$. This influences the steering-wheel angle setpoint $\delta_{SW,\,set}$ in such a way that the vehicle follows a given course, or at least the driver receives feedback via the steering wheel when he strays from a given course.

A further higher-order function is implemented in a vehicle-dynamics controller 61. A second correction angle $\delta_{SW,\,var2}$ is superimposed on the driver's steering input $\delta_{SW}$ as a function of the speed v, transverse acceleration $a_y$ and yaw rate $\omega$ of the vehicle. The steering-wheel angle setpoint $\delta_{SW,\,set}$ is generated from the driver's steering input $\delta_{SW}$, the speed-dependent conversion ratio and optionally the first correction steering angle $\delta_{SW,\,var1}$ and the second correction angle $\delta_{SW,\,var2}$. This steering-wheel angle setpoint $\delta_{SW,\,set}$ is the input variable of controller 45 from FIG. 2. Tracking controller 59 and the vehicle-dynamics controller 61 can also, of course, be switched off. Additional functions, such as, for example, a crosswind compensation system (not shown), can also be integrated into the setpoint generating system in like manner.

The advantages of the steer-by-wire system of the invention are, among other things, that the overall structure of the motor control system and the steering control system are easy to understand, and that higher-order and collateral functions can be integrated simply and independently of one another. With this structure, it is possible to generate situation-dependent setpoints $\delta_{VA}$ for the valve actuator 21, to design the controllers so that they are robust and fault-tolerant, and to apply the steering control system with the particular focus on making it driver-adaptive and user-friendly.

The steering-wheel control system can be implemented as a closed-loop or an open-loop system. As noted in connection with FIG. 1, the manual torque setpoint M, so is determined by means of the angular difference $\delta_{VA}-\delta_{pinion}$. Alternatively, the manual torque setpoint $M_{M,\,set}$ can be determined from the motor current $I_{actual}$ of valve actuator 21. In a further alternative, the manual torque setpoint $M_{M,\,set}$ can be generated via a family of characteristic curves or a performance graph (containing vehicle-dependent or driving-situation-dependent parameters). To prevent any erroneous determination of the manual torque setpoint $M_{M,\,set}$, both of the aforesaid methods of determining the manual torque setpoint can be used in parallel and a cross-check can be performed. The manual torque setpoint is delivered to a steering-wheel controller 63, which drives the steering-wheel motor 9 via a frequency converter 65 in such a way that the manual torque MM is transmitted to the steering wheel 1. In the design of the steering-wheel controller 63, special emphasis is placed on the torque ripple of the steering-wheel motor 9 to ensure that the steering feel is comfortable for the driver.

Figure 4:
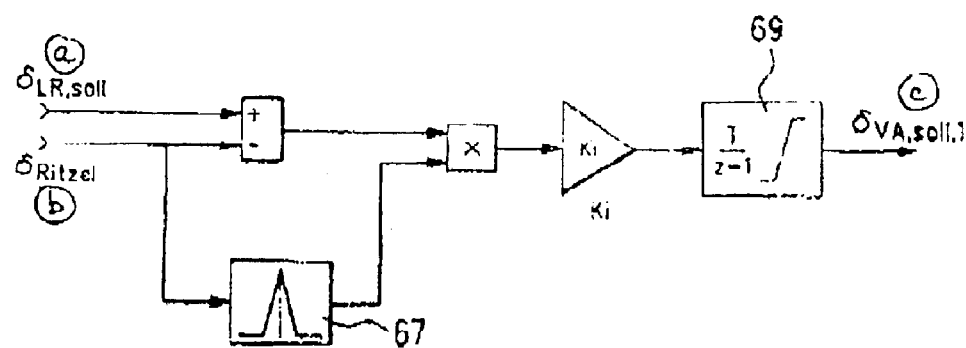
FIG. 4 is a block diagram of a second complement to the method of the invention.

FIG. 4 is a block diagram of a portion of the first controller 45 of FIG. 2. To enable the control system to respond with particular sensitivity to changes in the steering-wheel angle setpoint $\delta_{SW,\,set}$, which is a measure of the driver's steering input, the rotation angle of the pinion $\delta_{pinion}$ is branched off before the control difference $\delta_{SW,\,set}-\delta_{pinion}$ and is amplified according to the rotation angle $\delta_{pinion}$. As indicated by the characteristic curve 67 shown in FIG. 4, the amplification factor is high at the center position of the steering system and the steering device and falls away symmetrically from this center position. This signal modified by the characteristic curve is multiplied by the control difference $\delta_{SW,\,set}-\delta_{pinion}$. The resulting signal is then routed to an amplifier $K_i$ and subsequently to an integrator 69. The output variable of the integrator 69 is the first angle setpoint of the valve actuator, $\delta_{SW,\,set1}$.

This measure improves the response behavior of the steering system according to the invention during straight travel and causes the steering system to respond with greater sensitivity to even the smallest changes in the driver's steering input.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for positionally controlling an electric drive of a vehicle, said vehicle including a steering element and an electric drive, said method comprising:

determining the actual position of a steering element;

converting said actual position into a setpoint for the position of an electric drive;

detecting an actual value of the position of the electric drive;

generating a control difference between the setpoint and the actual value;

adjusting the position of the electric drive based on the control difference; and generating a restoring force for acting on the steering element from one of the forces acting on the electric drive, and a family of characteristic curves.

2. A method for steering a motor vehicle, said vehicle including a steering wheel, a plurality of steered wheels, and a steering controller, said method comprising:

detecting a steering wheel angle;

generating a setpoint for the position of the steered wheels from said detected steering wheel angle;

detecting an actual value of the position of said steered wheels;

generating a control difference between said setpoint and said detected actual value;

adjusting the position of said steered wheels based on said control difference; and adjusting a steering wheel torque based on one of the forces prevailing between the steered wheels and a steering controller, and a performance graph.

3. A control for a steer-by-wire system of a vehicle, said vehicle including steered wheels, a steering box, and a tie rod, said control comprising:

a steering wheel;

a steering column;

a rotation-angle sensor;

a steering-wheel motor acting on said steering column; and a steering actuator acting on the steered wheels by means of the steering box and the tie rod, and wherein said control operates according to the method of claim 2.

4. A method for steering a motor vehicle, said vehicle including a steering wheel, a plurality of steered wheels, a steering controller, a first controller, a compensator, a motor controller, and a hydraulic steering system which includes a valve actuator, said method comprising:

detecting a steering wheel angle;

generating a setpoint for the position of the steered wheels from said detected steering wheel angle;

detecting an actual value of the position of said steered wheels;

generating a control difference between said setpoint and said detected actual value;

adjusting the position of said steered wheels based on said control difference;

outputting from said first controller, as a manipulated variable derived from said control difference, a first setpoint of said valve actuator;

outputting from said compensator, in parallel with said first controller, as a manipulated variable derived from said setpoint for the position of said steered wheels, a second setpoint of said valve actuator;

adding said first setpoint and said second setpoint to yield a third setpoint of said valve actuator;

establishing said third setpoint as the reference variable of a motor controller; and adjusting a steering wheel torque based on one of the forces prevailing between the steered wheels and a steering controller, and a performance graph.

5. The method of claim 4 wherein said vehicle steering system includes a pinion, and said vehicle includes an integrator, said method further characterized in:

that in said first controller said control difference is amplified according to the rotation angle of the pinion in a region of a center position of the pinion; and that the product of said control difference and said amplification is integrated in an integrator to yield said first setpoint.

6. The method of claim 5 characterized in that the steering wheel torque setpoint is generated according to the difference between said rotation angle of said valve actuator and the rotation angle of the pinion.

7. The method of claim 6 wherein said vehicle includes a steering box, said method further characterized in that a transmission ratio of the hydraulic system is taken into account in the generation of said difference between said rotation angle of said valve actuator and said rotation angle of the pinion.

8. A steer-by-wire system for a vehicle, said vehicle including steered wheels, a steering box, and a tie rod, said system comprising a steering wheel, a steering column, a rotation-angle sensor, a steering-wheel motor acting on said steering column, a steering actuator acting on the steered wheels by means of a steering box and the tie rod, and a control which operates in accordance with the method of claim 7.

9. The steer-by-wire system of claim 8 further characterized in that said steering box is a hydraulics-steering box comprising a torsion-bar valve.

10. The steer-by-wire system of claim 8 further characterized in that said steering-wheel motor acts on said steering wheel by way of a gearbox.

11. The method of claim 4 wherein said vehicle further includes a master controller and a slave controller, said method further characterized in:

that said motor controller is a cascade controller comprising a master controller and at least one slave controller; and that a control difference of said master controller is generated from said third setpoint and the actual value of a rotation angle of said valve actuator.

12. The method of claim 11, further characterized in:

that said master controller is a position controller;

that the manipulated variable of said master controller is a rotation speed setpoint of said valve actuator;

that said control difference of said first slave controller which comprises a rotation speed controller is derived from a setpoint rotation speed and an actual rotation speed of said valve actuator; and that the manipulated variable of said rotation-speed controller is a torque setpoint of said valve actuator.

13. The method of claim 12 wherein said vehicle further includes a torsion bar valve, said method further characterized in:

that a first disturbance variable is subtracted from said manipulated variable of said master controller; and that said first disturbance variable is calculated according to the following equation:

$$M_{distl} = C_{torsion\ bar}(\delta_{pinion} - \delta_{VA,\ actual}),$$

wherein:

$C_{torsion\ bar}$ is a torsion spring rate of the torsion-bar valve.

14. The method of claim 13 further characterized in that said steering-wheel torque setpoint is determined based on one of the actual current of said valve actuator and a performance graph.

15. The method of claim 12 further characterized in:

that a damping torque is subtracted from said manipulated variable of said master controller; and that said damping torque is calculated according to the following equation:

$$M_{damp} = D(\omega_{pinion} - \omega_{VA,\ actual}),$$

wherein:

D is a constant

T is a rotation speed.

16. The method of claim 12 further characterized in:

that said manipulated variable of said first slave controller is a torque setpoint of said valve actuator; and that a current setpoint of said valve actuator is generated from said torque setpoint by means of a torque/current characteristic.

17. The method of claim 12 wherein said vehicle further includes a second slave controller, the method further characterized in:

that said control difference of a second slave controller which comprises a torque controller, is generated from said torque setpoint and said actual torque of said valve actuator.

18. The method of claim 17 wherein said vehicle includes a third slave controller and a frequency converter, said method further characterized in:

that said control difference of a third slave controller which comprises a current controller is generated from said current setpoint and said actual current of said valve actuator; and that said third slave controller drives said valve actuator by means of a frequency converter.

19. The method of claim 4 further characterized in that the generation of the setpoint for the position of the steered wheels is performed in a speed-dependent manner.

20. The method of claim 4 wherein said vehicle includes a tracking controller, said method further characterized in that a first correction angle is superimposed on said steering-wheel angle by a tracking controller based on a steering-wheel course angle.

21. The method of claim 20 wherein said vehicle includes a steering-wheel controller, the method further characterized in that said steering-wheel torque is adjusted by means of said steering-wheel controller.

22. The method of claim 4 wherein said vehicle includes a vehicle-dynamics controller, said method further characterized in that a second correction angle is superimposed on said steering-wheel angle by a vehicle-dynamics controller based on at least one of the road speed, the transverse acceleration, and the yaw rate of the vehicle.

* * * * *

UNITED STATES PATENT AND TRADEMARK OFFICE
CERTIFICATE OF CORRECTION

PATENT NO. : 6,879,118 B2
DATED : April 12, 2005
INVENTOR(S) : Chi-Thuan Cao et al.

It is certified that error appears in the above-identified patent and that said Letters Patent is hereby corrected as shown below:

<u>Title page,</u>
Item [75], Inventors, "Petral" should be changed to -- Petra --

Signed and Sealed this

Twenty-eighth Day of June, 2005

JON W. DUDAS
*Director of the United States Patent and Trademark Office*